(12) United States Patent
Girard

(10) Patent No.: US 6,450,520 B1
(45) Date of Patent: Sep. 17, 2002

(54) BICYCLE REAR SUSPENSION

(76) Inventor: Mario Girard, 103 de la Pointe aux Lievres Apt. 112, Quebec, Quebec (CA), G1K 5Y4

( * ) Notice: Subject to any disclaimer, the term of this patent is extended or adjusted under 35 U.S.C. 154(b) by 0 days.

(21) Appl. No.: 09/457,314

(22) Filed: Dec. 9, 1999

Related U.S. Application Data

(63) Continuation of application No. PCT/CA98/00574, filed on Jun. 10, 1998.

(30) Foreign Application Priority Data

Jun. 10, 1997 (CA) .......................................... 2207802

(51) Int. Cl.⁷ ............................................. B62K 25/28
(52) U.S. Cl. ..................................... 280/284; 280/275
(58) Field of Search ................................ 280/275, 276, 280/283, 284, 281.1, 285, 288; 180/227

(56) References Cited

U.S. PATENT DOCUMENTS

| 644,787 A | 3/1900 | Williams |
| 644,788 A | 3/1900 | Williams |
| 644,957 A | 3/1900 | Williams |
| 1,157,431 A | 10/1915 | Shimmin |
| 1,261,441 A * | 4/1918 | Rigby ......................... 280/276 |
| 1,266,800 A | 5/1918 | Harley |
| 1,272,399 A | 7/1918 | Douglas |
| 1,340,508 A | 5/1920 | Walker |
| 5,259,637 A | 11/1993 | Busby |
| 5,306,036 A | 4/1994 | Busby |
| 5,356,165 A | 10/1994 | Kulhawik et al. |
| 5,405,159 A | 4/1995 | Klein et al. |
| 5,452,910 A * | 9/1995 | Harris ......................... 280/283 |
| 5,474,318 A | 12/1995 | Castellano |
| 5,498,014 A | 3/1996 | Kulhawik et al. |
| 5,474,318 A | 12/1997 | Castellano |
| 5,813,683 A * | 9/1998 | Kulhawik et al. ........... 280/275 |
| 5,947,499 A * | 9/1999 | Busby ......................... 280/275 |

FOREIGN PATENT DOCUMENTS

| DK | 27210 | 2/1921 | |
| EP | 0 113 333 A1 | 7/1984 | |
| EP | 0 422 324 A1 | 4/1991 | |
| EP | 0 723 907 A1 | 7/1996 | |
| FR | 979160 * | 4/1902 | .................. 280/284 |
| FR | 2 683 785 A1 | 5/1993 | |
| IT | 425968 | 10/1947 | |
| IT | 435511 | 3/1948 | |
| IT | 449681 | 6/1949 | |

OTHER PUBLICATIONS

Mountain Bike Action, First Dirt for Proflex's 855, Feb. 1995, pp. 51–55.

(List continued on next page.)

*Primary Examiner*—Anne Marie Boehler
(74) *Attorney, Agent, or Firm*—Ogilvy Renault

(57) ABSTRACT

A rear suspension (10,64) for mountain bikes comprises a rigid link (46,98) pivotally mounted at opposed ends thereof to a lower rear portion of a main bicycle frame (14,74,96) and at a lower front portion of a bicycle swingarm (16,92). The rigid link (46,98) allows for relative displacements between the main bicycle frame (14,74,96) and the bicycle swingarm (16,92) along two degrees of freedom and, more particularly, for displacements in an area defined by the position of the two pivots (P1,P2) with respect to a rear wheel axle (WA), by the spacing between the two pivots (P1,P2) and also by the possible deformation of a spring (48,66) provided between the main frame (14,74,96) and the swingarm (16,92). A leaf spring (48,66) may be used within a shock absorber system which also includes a damper in order to limit relative displacements between the main frame (14,74,96) and the swingarm (16,92) upon impact of the rear wheel with an obstacle.

16 Claims, 9 Drawing Sheets

OTHER PUBLICATIONS

Vélo Mag, Les suspensions arrières: Des forces à domestiquer, Printemps 1996, pp. 38–40.

Mountain Bike Action, Foes Fab Weasal, Sep. 1995, pp. 49–60.

Mountain Bike Action, Floating Drivetrain Klein, Feb. 1995, pp. 67–70.

Mountain Bike Action, Floating GT's Fully Active LTS, Feb. 1995, pp. 56–63.

Guide to Suspension and High Performance, Dual Suspension Bike of the Decade?, Vic Armijo, vol. 2, 1996, pp. 11–12 & 17–18.

* cited by examiner

BICYCLE REAR SUSPENSION

CROSS-REFERENCE

This application is a continuation of PCT/CA98/00574 filed Jun. 10, 1998 designating the United States and claiming priority of Canadian Patent Application serial number 2,207,802 filed Jun. 10, 1997.

BACKGROUND OF INVENTION

1. Field of Invention

The present invention relates to bicycles and, more particularly, pertains to bicycle rear suspensions.

2. Description of Prior Art

Generally, rear suspensions for mountain bicycles comprise shock absorber systems including various types of springs and shock absorbing devices, and a pivot system defining the path of the rear wheel upon impact thereof with an uneven ground surface.

Simple bicycle rear suspension designs essentially comprise a main pivot located on a main frame of the bicycle for pivotally connecting thereto a swingarm or a rear frame portion. According to this type of rear suspension, the rear wheel pivotally moves in a circular path of constant radius about a single axis of rotation which is fixed relative to the main frame of the bicycle. This first category of bicycle rear suspensions may be embodied in different forms and configurations, such as the "MacPherson Strut" (see "First Dirt for Proflex 855", Mountain Bike Action, February 1995, pp. 51–55; and "Les suspensions arrière: Des forces à domestiquer", Yannick Boivin, Vélo Mag, Spring 1996, pp. 38–40) and its variants; the "cantilever beam" (see "Foes Fab Weasel", Mountain Bike Action, September 1995, pp. 49–60); and the "floating drivetrain" (see "Floating Drivetrain Klein", Mountain Bike Action, February 1995, pp. 67–70).

Other types of bicycle rear suspensions are provided with more sophisticated linkage systems comprising upper and lower links adapted to pivotally connect the swingarm to the front frame portion of the bicycle such as to allow the rear wheel to travel in a different arc than with a single link system (see ""Floating GT's Fully Active LTS", Mountain Bike Action, February 1995, pp. 56–63; "Dual Suspension bike of the decade?", Vic Armijo, Guide to Suspension and high performance, volume 2, 1996, pp. 11–12; and U.S. Pat. Nos. 5,259,637 and 5,306,036 issued to Busby on Nov. 9, 1993 and on Apr. 26, 1994, respectively). More particularly, these two Busby U.S. Patents disclose a bicycle rear suspension linkage system comprising two upper pivots and two lower pivots which are rigidly interconnected to constrain the motion of a swingarm with respect to a main bicycle frame. The unique rear wheel axle path upon impact of the rear wheel on an obstacle is thus determined by the relative positions of the upper and lower pivots. Busby's bicycle rear suspension linkage system further comprises a shock absorber which is adapted to limit the amplitude of the motion of the rear wheel axle without having any influence on the trajectory thereof.

U.S. Pat. No. 5,405,159 issued to Klein et al. on Apr. 11, 1995 discloses a suspension system comprising a rotating damper link pivotally connected at a first end thereof to an upper portion of a main frame and at a second end thereof to an upper portion of a swingarm, and a composite spring disposed between lower portions of the main frame and swingarm. The composite spring is designed to act as a rigid link in a horizontal plane and thus only one variable is needed to specify the position of the rear wheel axle in the plane of the bicycle frame.

Therefore, there is a need for a bicycle suspension system which allows the rear wheel axle to follow various paths in response to, and depending from, various obstacles encountered by the bicycle's rear wheel.

SUMMARY OF INVENTION

It is therefore an aim of the present invention to provide a rear suspension having two degrees of freedom and which is particularly suitable for bicycles including mountain bikes.

It is also an aim of the present invention to provide a rear suspension which allows a rear wheel to define different trajectories according to the type of obstacles encountered by the rear wheel of the bicycle.

Therefore, in accordance with the present invention, there is provided a rear suspension system for a bicycle having a main frame and a swingarm supporting a rear wheel axle about which a rear wheel may rotate, comprising link means pivotally mounted at two spaced-apart locations to said main frame and to said swingarm, and biasing means for normally urging said swingarm and said main frame in a relative equilibrium position, while allowing said rear wheel axle to move along various paths relative to said main frame in response to different shock forces exerted on the rear wheel.

Also in accordance with the present invention, there is provided a rear suspension system for a bicycle having a main frame and a swingarm, comprising a substantially rigid link means having a first end portion thereof pivotally connected to the main frame and a second opposed end portion thereof pivotally connected to the swingarm, and shock absorber means adapted to cooperate with said link means for substantially constricting relative motions of the main frame and the swingarm to two independent directions.

Further in accordance with the present invention, there is provided a rear suspension system for a bicycle having a main frame and a swingarm, comprising a substantially rigid link means pivotally mounted at two spaced-apart locations to the main frame and to the swingarm, and resilient connecting means mounted between the main frame and the swingarm for normally urging the main frame and the swingarm in a relative equilibrium position, while enabling said rear suspension system to have two degrees of freedom.

Still further in accordance with the present invention, there is provided a bicycle frame, comprising a main frame, a swingarm supporting a rear wheel axle about which a rear wheel may be mounted, a rear suspension system comprising link means pivotally mounted at two spaced-apart locations to said main frame and to said swingarm, and biasing means for normally urging said swingarm and said main frame in a relative equilibrium position, while allowing said rear wheel axle to move along various paths relative to said main frame in response to different shock forces exerted on the rear wheel.

More specifically, the bicycle frame includes a pedal crankset assembly mounted to a lower portion of said swingarm, said link means being pivotally mounted at a first end portion thereof to a lower rear portion of said main frame for rotation about a first pivot axis, said link means being pivotally mounted at a second end portion thereof to a lower front portion of said swingarm for rotation about a second pivot axis, said second pivot axis being located above or below a principal axis of the bicycle when said main frame and said swingarm are in said relative equilibrium position, said principal axis extending through said first pivot axis and parallelly to a bicycle axis extending through the front and rear wheel axles of the bicycle.

Also, the second pivot axis may be located in front of the pedal crankset assembly.

Alternatively, the bicycle frame may include a pedal crankset assembly mounted to a lower portion of said main frame, said link means being pivotally mounted at a first end portion thereof to a lower rear portion of said main frame for rotation about a first pivot axis, said link means being pivotally mounted at a second end portion thereof to a lower front portion of said swingarm for rotation about a second pivot axis, said first pivot axis being located below the pedal crankset assembly.

Furthermore, the biasing means may have two degrees of freedom.

Moreover, the biasing means include spring means and damper means extending between said main frame and said swingarm, said spring means being adapted for deflection in two at least partially independent directions in a plane containing said main frame and said swingarm.

Specifically, the spring means comprise a leaf spring located above said link means. The spring may include an upwardly arcuate portion, said leaf spring being adapted to be rigidly attached at a first end portion thereof to an upwardly extending rear member of the main frame and at a second opposed end portion thereof to an upper member of the swingarm.

Alternatively, the leaf spring may have a substantially inverted U-shaped configuration, said leaf spring being adapted to be rigidly attached at a first end portion thereof to an upwardly extending member of the main frame and at a second opposed end portion thereof to an upwardly extending front member of the swingarm.

Typically, the damper means are pivotally connected at opposed end portions thereof to the main frame and to the swingarm.

BRIEF DESCRIPTION OF THE DRAWINGS

Having thus generally described the nature of the present invention, reference will now be made to the accompanying drawings, showing by way of illustration a preferred embodiment thereof, and in which.

DESCRIPTION OF THE PREFERRED EMBODIMENTS

Figure 1:
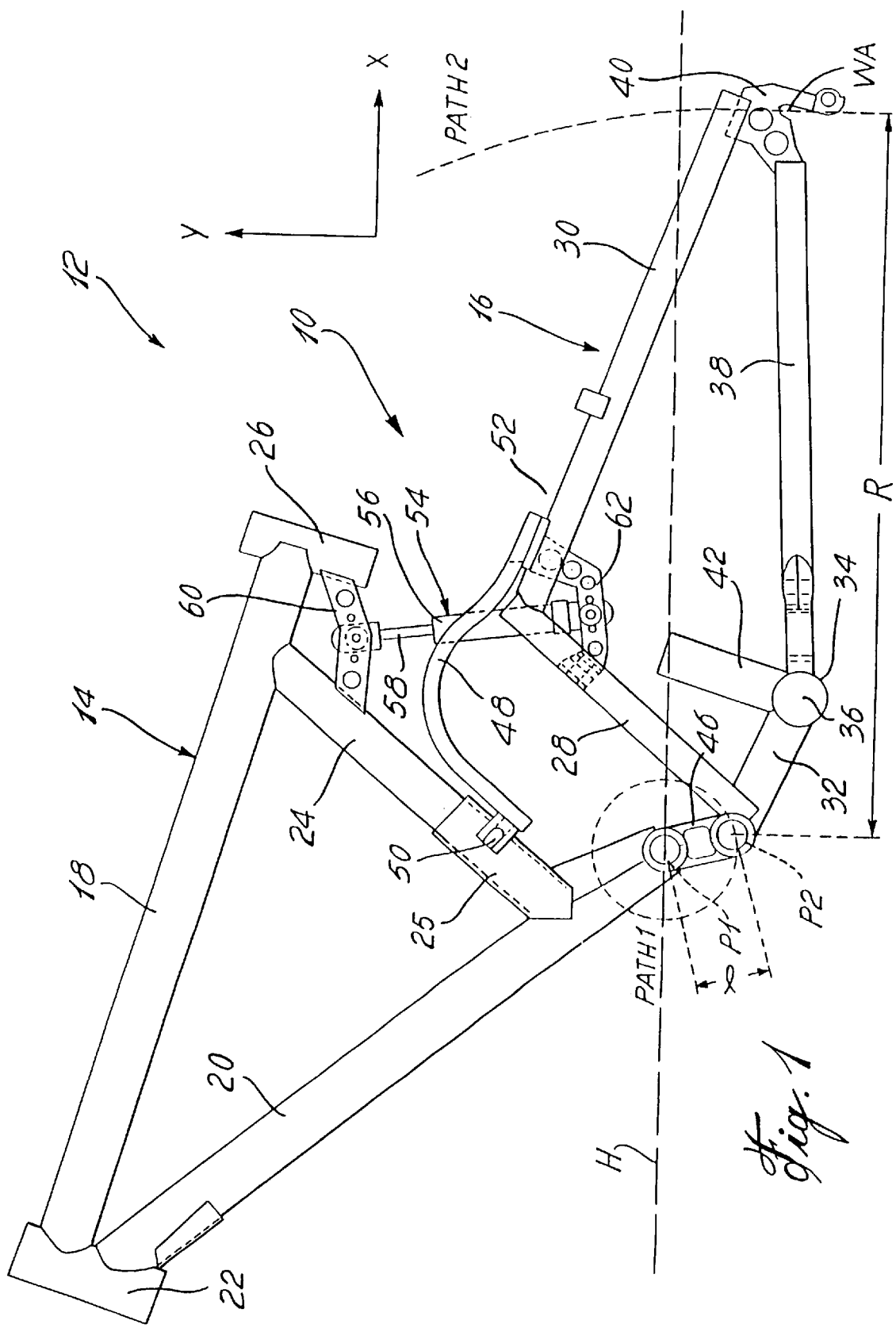
FIG. 1 is a side elevational view of a floating drivetrain type bicycle frame having a rear suspension with two degrees of freedom in accordance with the present invention.
Figure 2:
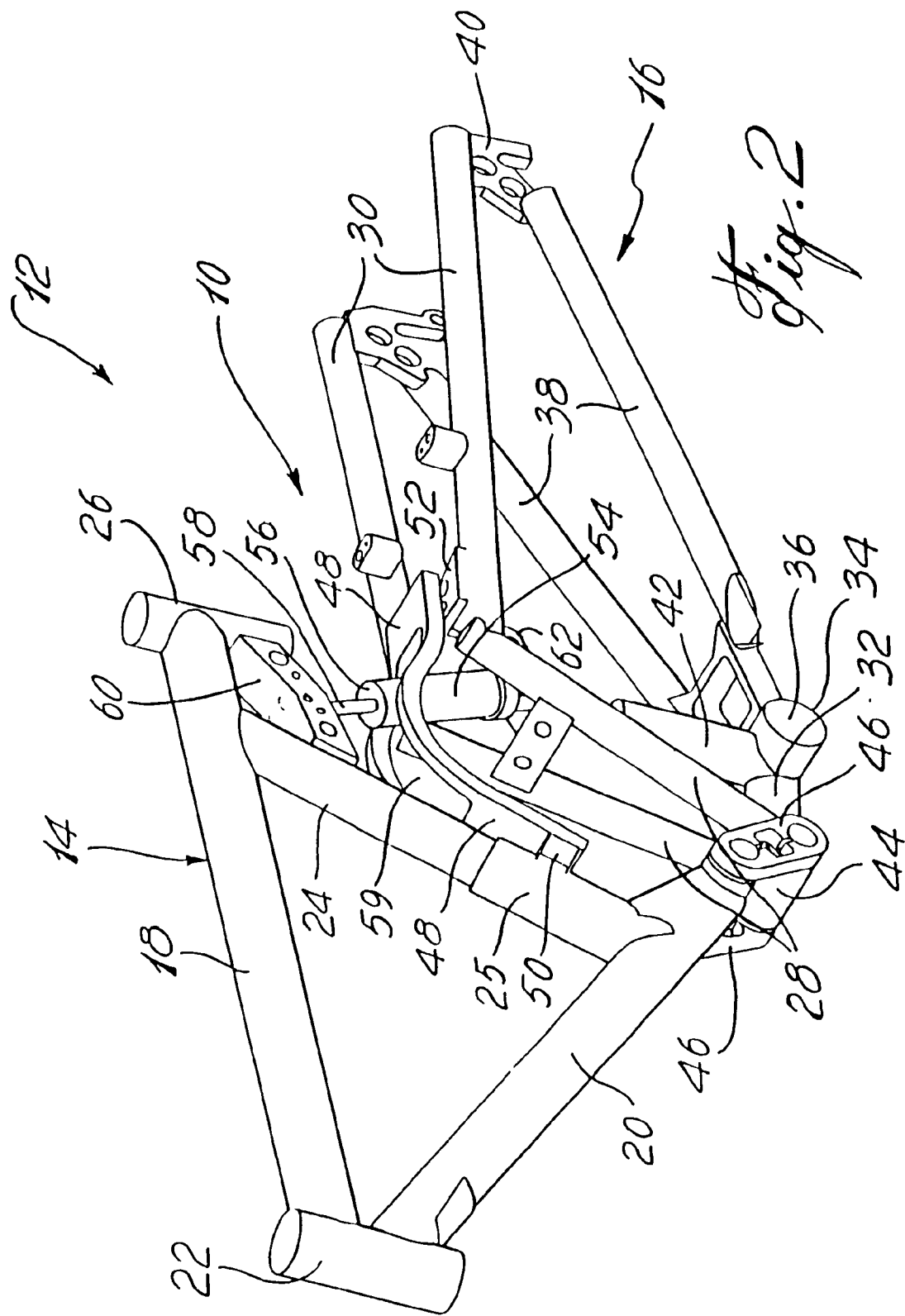
FIG. 2 is an isometric view of the bicycle frame of FIG. 1.

Now referring to the drawings, and in particular to FIGS. 1 and 2, there is shown a rear suspension for bicycles in accordance with the present invention which has two degrees of freedom and which is generally designated by numeral 10.

More specifically, FIGS. 1 and 2 illustrate a bicycle frame 12 constructed to incorporate the two degrees of freedom bicycle rear suspension 10. The bicycle frame 12 basically comprises a main frame 14 and a swing arm 16 rearwardly thereof. The main frame 14 is formed of a cross bar or top tube 18 and a down tube 20 joined at first ends thereof by a head tube 22 and at second end portions thereof by a spring tube 24. A lower end of the spring tube 24 is received within a substantially cylindrical sleeve 25 extending upwardly at an angle from a lower end portion of the down tube 20. A seat tube 26 is provided at the rear end of the top tube 18 for receiving a seat post (not shown) in a way well known in the art.

The swing arm 16 essentially comprises a pair of pivot front tubes 28 having upper ends from which rearwardly extend a pair of spring stay members 30. Extending from the lower ends of the pivot front tubes 28 is a lower pivot mount 32 which is provided at an opposed end thereof with an axle receiving bracket 34 defining a bore 36 extending axially therethrough for receiving a bottom bracket axle (not shown) of a pedal crankset assembly of the bicycle.

Extending from the rear side of the axle receiving bracket 34 is a pair of chain stay members 38. A rear wheel axle dropout bracket 40 connects the rear end of each spring stay member 30 with the rear end of a respective chain stay member 38. The dropout brackets 40 are adapted to receive therebetween the axle of a rear wheel (not shown). The rear axle dropout brackets 40 are disposed on opposed sides of the swingarm 16 between the spring stay members 30 and the chain stay members 38. Extending upwardly from the axle receiving bracket 34 is a front derailleur tube 42 which is adapted to support a front derailleur (not shown).

The lower ends of the pivot front tubes 28 are rigidly connected to each other by a transversal member 44 with the lower pivot mount 32 extending rearwardly therefrom.

According to a preferred embodiment of the present invention, the pivot front tubes 28, the spring stay members 30, the rear wheel axle dropout brackets 40, the chain stay members 38, the axle receiving bracket 34, the lower pivot mount 32 and the transversal member 44 each have a generally cylindrical configuration and are secured to one another by means of welded or braised connections.

Similarly, the components of the main frame 14, namely the top tube 18, the down tube 20, the head tube 22, the spring tube 24 and the seat tube 26 each have a generally cylindrical configuration and are rigidly connected to one another by means of welded or braised connections.

The two degrees of freedom bicycle rear suspension 10 includes a pair of parallel rigid links 46 which are pivotally mounted at respective first ends thereof to a lower end portion of the down tube 20 for rotation about a first rotation axis, P1 and at respective second ends thereof to opposed ends of the transversal member 44 for rotation about a common second pivot axis P2. The swingarm 16 is also connected to the main frame 14 via a leaf spring 48 having a front end thereof attached to a first bracket 50 mounted on the sleeve 25 and a rear end attached to a second bracket 52 mounted to the upper ends of the spring stay members 30. The leaf spring 48 has an upwardly arched configuration and is constituted of a composite material or, alternatively of a metallic substance composed of two or more metals. The shape and configuration of the leaf spring 48 allows the same to be deformed in two independent directions within the plane of the bicycle frame 12, e.g. in the plane x-y illustrated in FIG. 1. The leaf spring 48 thus acts as a biasing means to normally urge the swingarm 16 in an equilibrium position relative to the main frame 14, while allowing the rear wheel axle WA to move in two independent directions.

By having two independent pivots (namely the first pivot axis P1 and the second pivot axis P2) with one pivot being disposed on the main frame 14 and the other pivot on the swing arm 16, a rear suspension having two degrees of freedom is obtained.

The above described connection between the main frame 14 and the swingarm 16 allows for the rear wheel (not shown) to reduce the component of the impact speed in the moving direction of the bicycle (normally axis "x" in FIG. 1), while allowing for the rear wheel to be displaced in an independent direction perpendicular to the moving direction of the bicycle (typically axis "y" in FIG. 1) when the rear wheel encounters a bump or other obstacles. As the rear wheel may be displaced in the plane x-y, the rear suspension 10 is not affected by the position of a principal axis H of the bicycle (i.e. an axis extending through pivot P1 and parallel to an axis extending through the front and rear wheel axles of the bicycle) relative to the direction of the force applied to the rear wheel. Therefore, in the event that the principal axis H of the bicycle is not perpendicular to the shock force exerted on the rear wheel, the rear suspension 10 will perform as well as when the principal axis H is perpendicular to the direction of the shock force.

The relative position of the pivots P1 and P2 is optimal when the axis extending through the center of pivots P1 and P2 is perpendicular to the axis extending through the center of the front and rear wheels (not shown) of the bicycle. The efficiency of the bicycle rear suspension 10 reduces as the axis extending through the center of pivots P1 and P2 becomes parallel to the axis extending through the center of the rear and front wheels.

Figure 3:
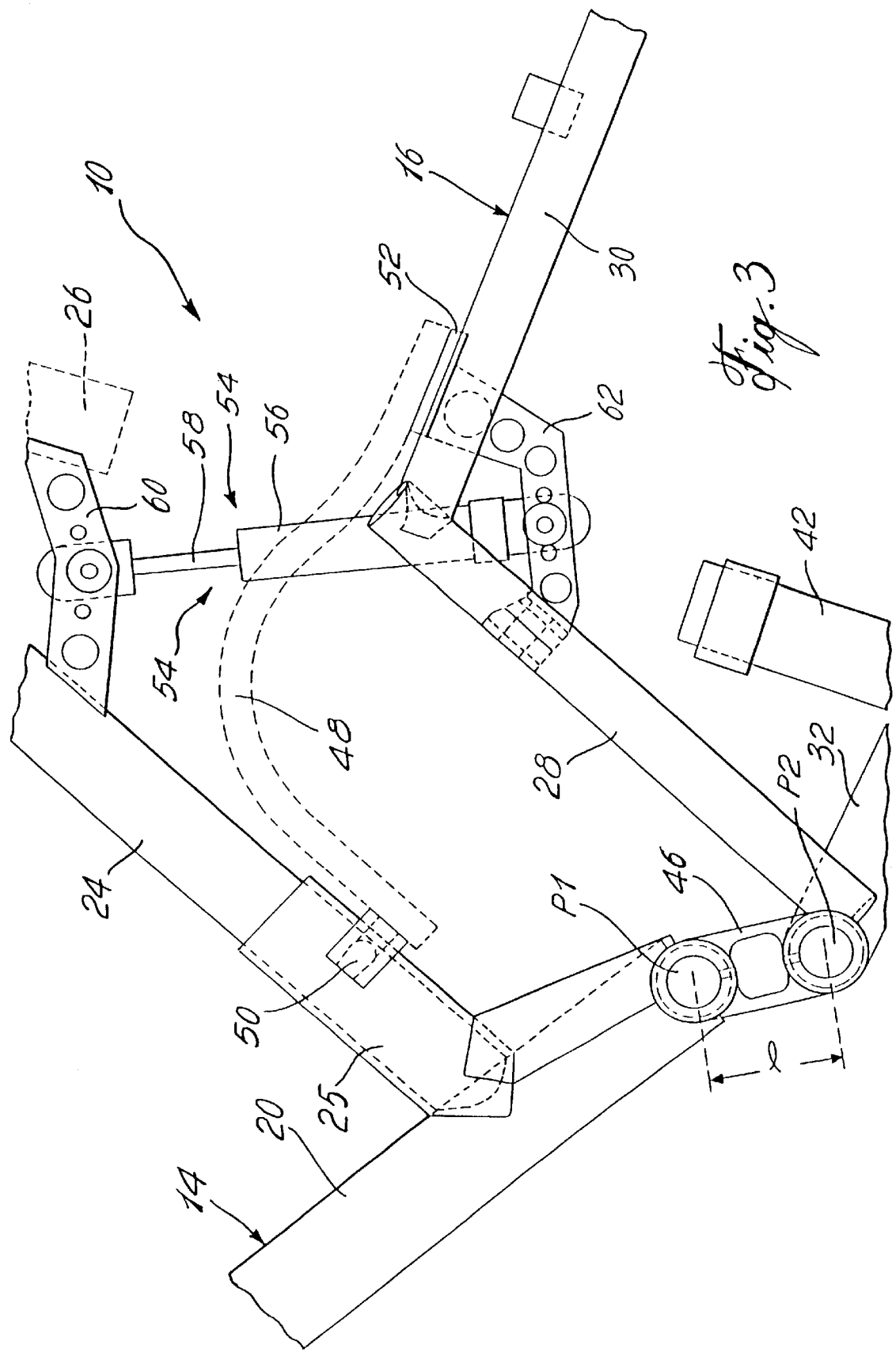
FIG. 3 is an enlarged side elevational view of a portion of the rear suspension which comprises a link pivotally mounted at a first end thereof to a main frame and at a second end thereof to a swingarm, a leaf spring and a shock absorber.

According to the preferred embodiment illustrated in FIGS. 1 to 3, the two degrees of freedom rear suspension 10 is provided with a damper 54 which in concert with the leaf spring 48 provides a shock absorbing unit to absorb the various impact forces communicated to the rear wheel of the bicycle.

The damper 54 comprises a cylinder 56 having a reciprocating piston 58 extending axially therein and outwardly from an upper end thereof. The piston 58 of the damper 54 extends through a longitudinal slot 55 defined in leaf spring 48. The upper end of the piston 58 is pivotally connected to a mounting bracket 60 extending between the lower end portion of the seat tube 26 and the spring tube 24. The lower end of the cylinder 56 of the damper 54 is pivotally mounted to a mounting bracket 62 secured at a front end thereof to the pivot front tubes 28 and at a rear end thereof to the spring stay members 30. Accordingly, the damper 54 is adapted to convert the energy of the shock force applied to the rear wheel of the bicycle into stresses within itself such as to significantly reduce the oscillation of the swingarm 16 and to control the amplitude of the motion of the rear wheel.

It is understood that other shock absorber systems may be used as long as they allow for displacements along two independent or partially independent axes. Typically, a shock absorber system having two independent axes will include at least a spring unit, such as a coil spring and/or a leaf spring, and an appropriate damping unit, whereas a shock absorber system having two partially independent axes will generally include only one leaf spring having two independent axes along which the leaf spring may be deformed.

Figure 5:
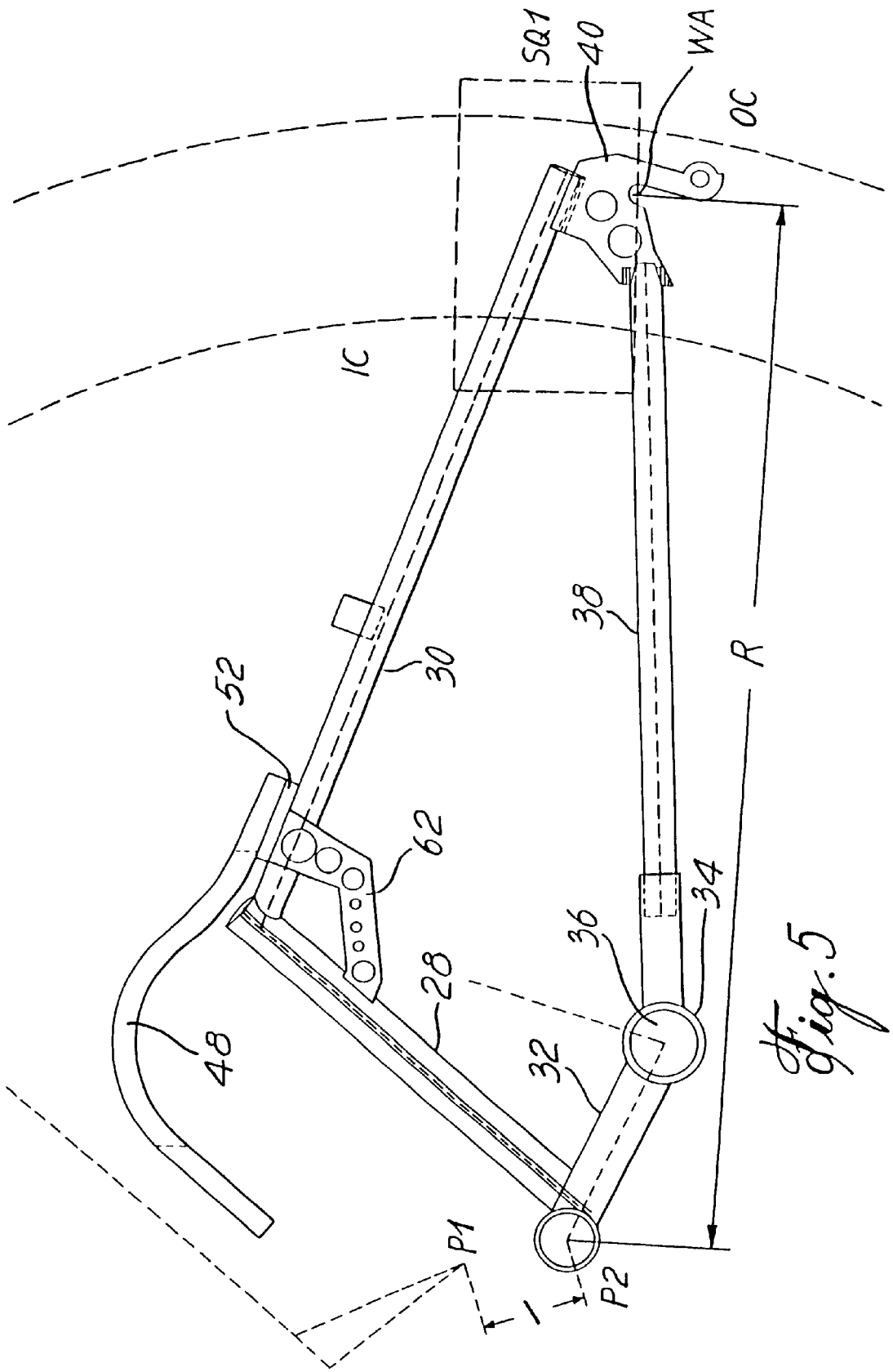
FIG. 5 is a schematic side elevational view of the rear suspension illustrating the limits of the area in which the rear wheel can move in response to collision forces.
Figure 6:
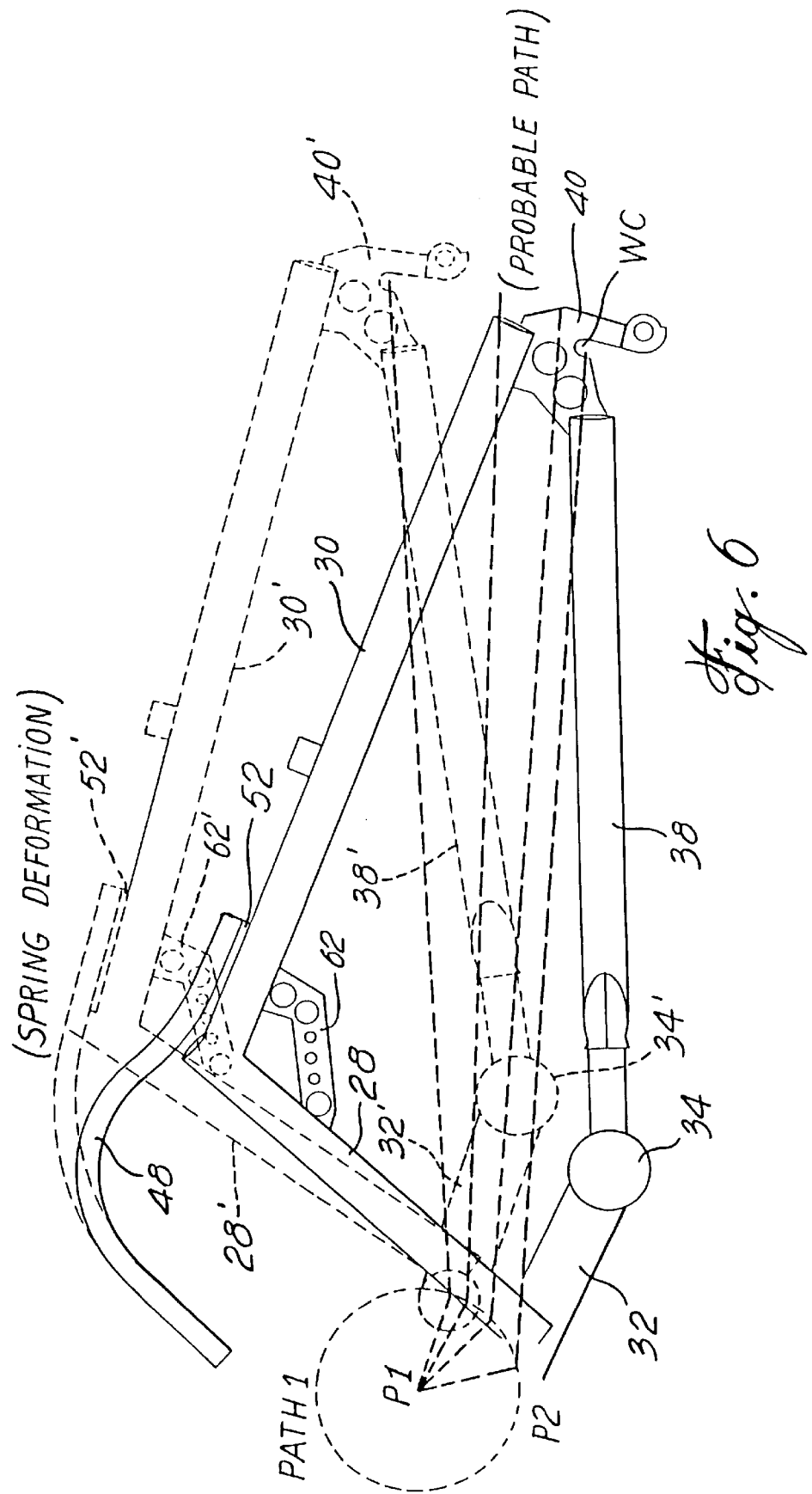
FIG. 6 is a schematic side elevational view of the rear suspension showing a possible rear wheel path resulting from a collision with a given obstacle.

Referring now more specifically to FIGS. 1 and 5, it can be seen that the first pivot P1 is located on the main frame 14, whereas the second pivot P2 is located on the swingarm 16. As seen in FIG. 5, the first and second pivots P1 and P2 allow for the rear wheel axle WA to travel along two independent directions, i.e. according to two degrees of freedom, in an area or envelope delimited between a first circle OC having for center the pivot P1 and a radius "R+l" and a second concentric circle of radius "R−.l", wherein "R" corresponds to the distance between the second pivot P2 and the axle WA of the rear wheel and "l" to the distance between the first and second pivots P1 and P2. The pivot P2 may be displaced along a circular path of radius "l" around the pivot P1, as illustrated in FIGS. 1 and 6. The rear wheel axle WA may be displaced along a circular path (e.g. PATH 2 in FIG. 1) around the second pivot P2.

The linear combination of the two rotational movements permit an infinite number of rear wheel axle WA trajectories within the area delimited by the difference between the inner surfaces OC and IC. Furthermore, the area accessible by the rear wheel axle WA will be limited by the possible deformation of the leaf spring 48 and by the maximal amplitude of the damper 54, as represented by the square area SQ1 in FIG. 5. The intersection of the area OC-IC with the area SQ1 determines the accessible area within which the rear wheel axle WA may move. FIG. 6 illustrates an example of a possible trajectory of the rear wheel axle WA when the rear wheel encounters a given obstacle.

The shock absorber system may be comprised of a number of springs and of a conventional damper, but it is preferable to use a composite leaf spring having two degrees of freedom, as it enhances lateral rigidity and contributes to minimizing the weight of the bicycle.

Although a plurality of pivot locations are possible to enable the rear wheel axle WA to be displaced in a plane in response to a shock force applied to the rear wheel, it is understood that some special configurations and locations are preferable to achieve the full benefit of the suspension and to provide increased torsional rigidity.

Indeed, the locations of the first and second pivots P1 and P2 and of the leaf spring 48 are not important for allowing the bicycle rear suspension 10 to have two degrees of freedom but greatly affect the sensibility of the suspension and the lateral rigidity of the overall system. When the crankset pedal assembly (not shown) is mounted to the swingarm 16 as described hereinbefore, it is preferable to place the first pivot P1 in the lower area of the main frame 14, at the lower end of the down tube 20. The second pivot P2 may be located in front of the axle receiving bracket 34 but must be disposed above or below the principal axis H extending through the first pivot P1 and parallelly to an axis extending through both the front and rear wheel axles. Finally, it is preferable to place the leaf spring 48 above the first and second pivots P1 and P2.

Figure 4:
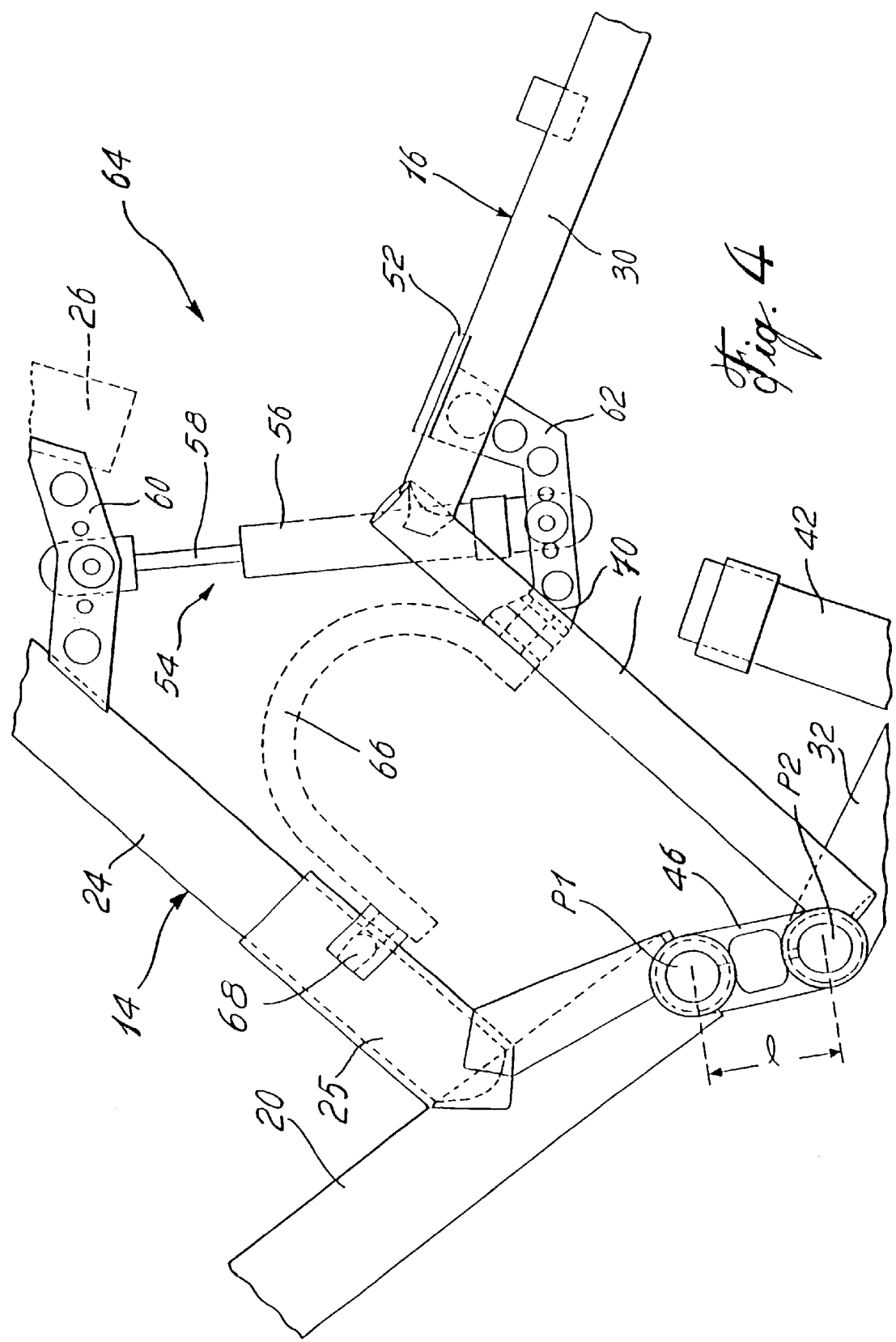
FIG. 4 is an enlarged side elevational view of the rear suspension showing a variant of the leaf spring of FIG. 3 in accordance with a second embodiment of the present invention.

FIG. 4 illustrates a two degrees of freedom bicycle rear suspension 64 in accordance with a second embodiment of the present invention, wherein a leaf spring 66 having a substantially inverted U-shaped configuration is attached at a front end thereof to a first bracket 68 mounted to the sleeve 25 and at an opposed rear end thereof to a second bracket 70 secured to the pivot front tubes 28. The leaf spring 66 is deformable along independent directions in the plane of the bicycle frame 12 and is adapted to generate trajectories for the rear wheel axle WA which are different than those produced by the leaf spring 48.

Figure 7:
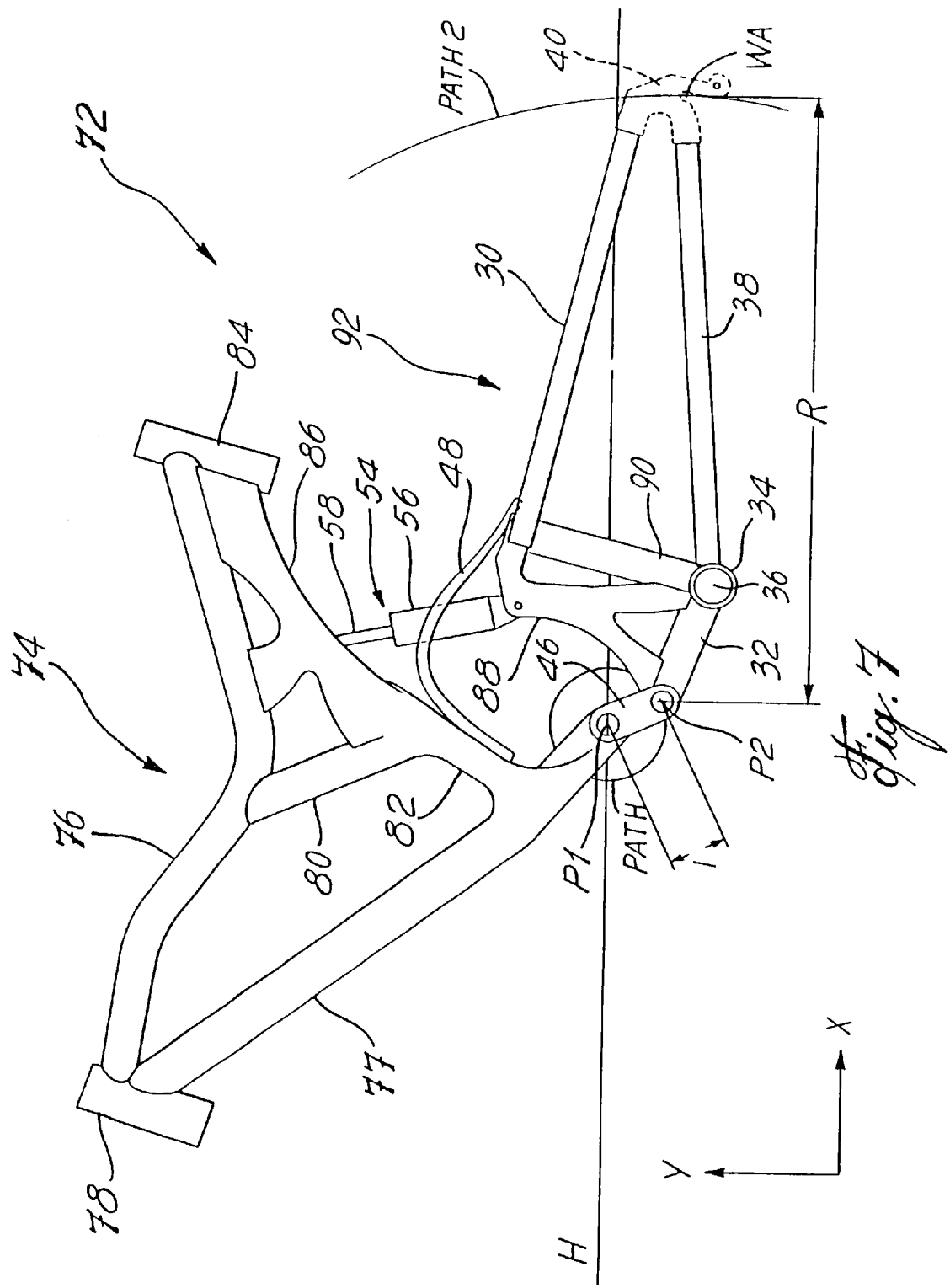
FIG. 7 is a side elevational view of a bicycle frame in accordance with a third embodiment of the present invention.
Figure 8:
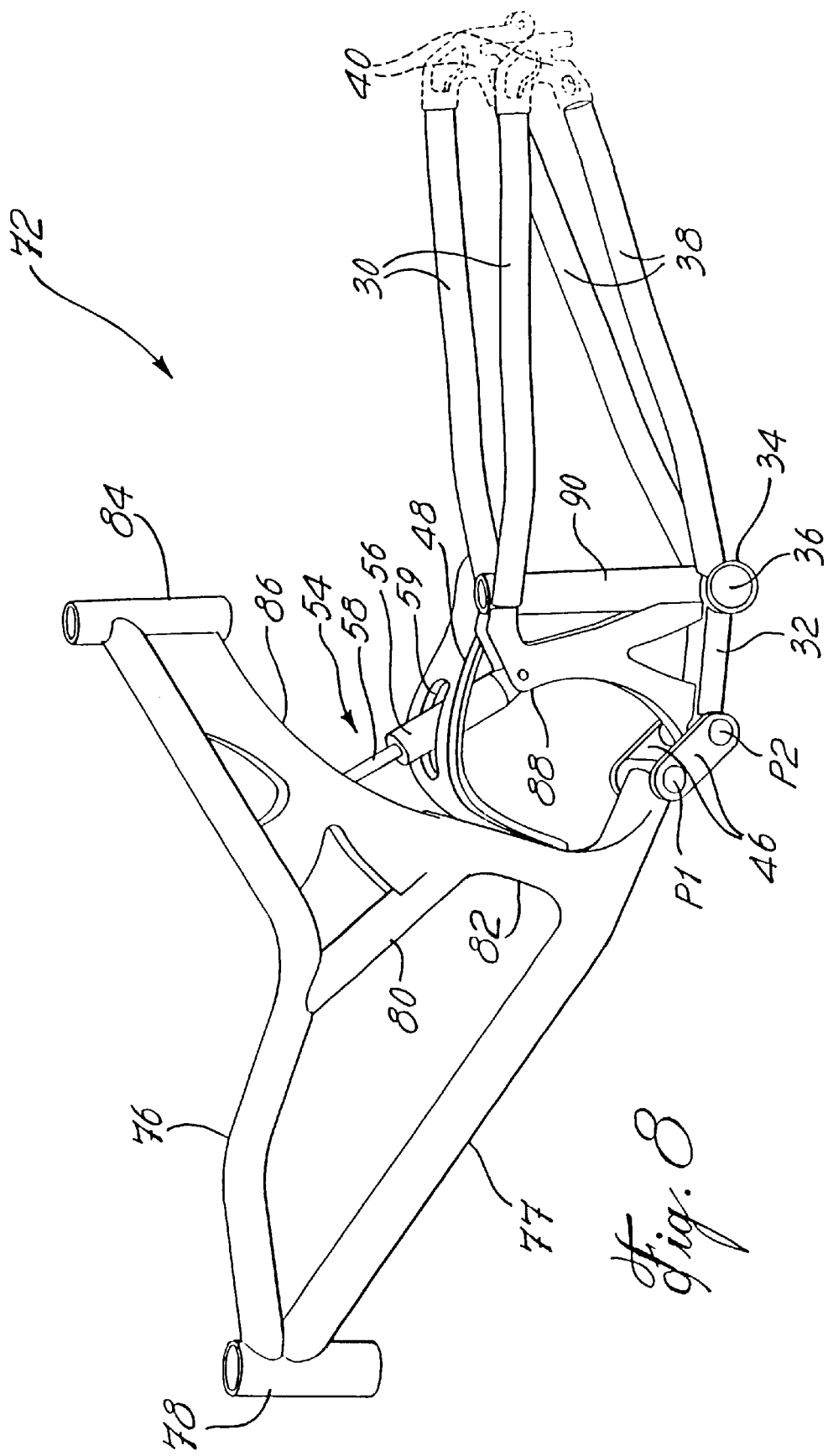
FIG. 8 is a perspective view of the bicycle frame of FIG. 7.

FIGS. 7 and 8 illustrate a different bicycle frame configuration 72 which may be used in combination with the above described two degrees of freedom bicycle rear suspensions 10 and 64 in accordance with a third embodiment of the present invention. The bicycle frame configuration 72 includes a main frame 74 including a curved top tube 76 and a down tube 77 rigidly connected to each other by a head tube 78 disposed at the front end of the main frame 74 and by an inclined tube 80 extending upwardly and forwardly from a junction member 82 welded to a lower end portion of the down tube 77. A seat tube 84 is rigidly connected to a rear end of the curved top tube 76 for slidably receiving a seat post (not shown). A pair of parallel spaced apart three-branched supporting brackets 86 are secured to the top curved tube 76, to the seat tube 84 and to the junction member 82 for pivotally receiving therebetween the upper end of the reciprocating piston 58 of the damper 54. The lower end of the damper 54 is pivotally mounted between a pair of spaced apart parallel supporting brackets 88 having three branches rigidly connected respectively to an upper end of a front derailleur tube 90, to the axle receiving bracket 34 and to the lower pivot mount 32 forming part of a swingarm 92. The main difference between the swingarm 16 and the swingarm 92 is that the front derailleur tube 90 of the swingarm 92 extends from the axle receiving bracket 34 to the spring stay member 30, thereby eliminating the necessity of having pivot front tubes 28. Furthermore, it is noted that, according to the embodiment illustrated in FIGS. 7 and 8, the connection of the damper 54 to the swingarm 92 is located in front of the front derailleur tube 90.

Figure 9:
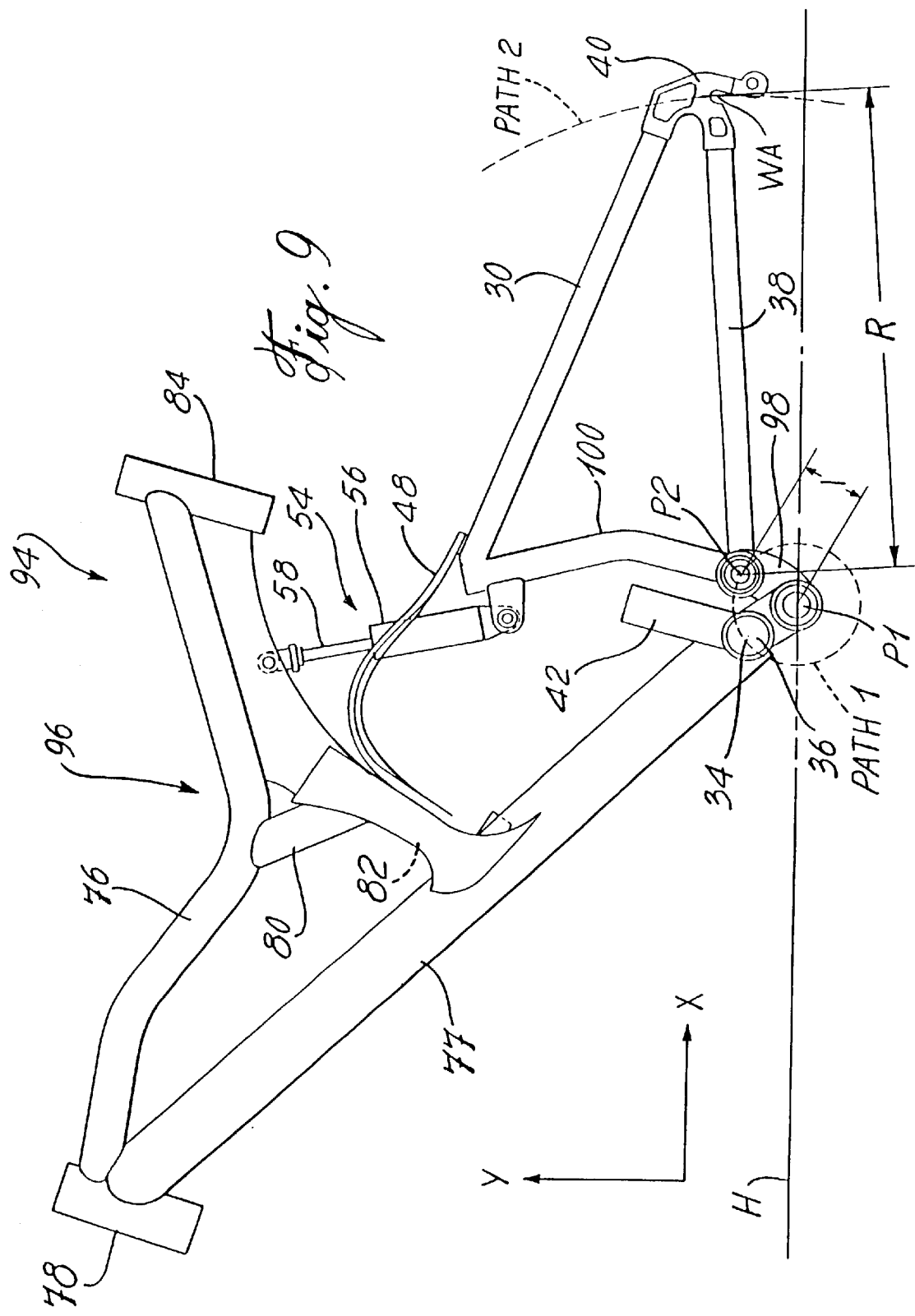
FIG. 9 is a side elevational view of a bicycle frame of the fixed crankset assembly type in accordance with a fourth embodiment of the present invention.

FIG. 9 illustrates another bicycle frame configuration according to a fourth embodiment of the present invention, wherein the pedal crankset assembly (not shown) is mounted on the main frame 96 of the bicycle and, more particularly to a lower end of the down tube thereof. This type of design is known as a fixed pedal crankset assembly because the location of the pedal crankset assembly is fixed with respect to the main frame 96. According to this embodiment, it can be seen that the first pivot P1 is located below the axle receiving bracket 34, and that the rigid link 98 and the pivot front tubes 100 are elbowed such that their apexes extend rearwardly. It is pointed out that the fixed crankset assembly configuration illustrated in FIG. 9 allows for the rear suspension to react similarly whether the user stands on the pedals (not shown) or sits on the seat (not shown).

What is claimed is:

1. A rear suspension system for a bicycle having a main frame and a swingarm supporting a rear wheel axle about which a rear wheel may rotate, comprising link means pivotally mounted at two spaced-apart locations to said main frame and to said swingarm, and biasing means for normally urging said swingarm and said main frame in a relative equilibrium position, said link means and said biasing means cooperating for constricting relative motions of said main frame and said swingarm to two degrees of freedom, wherein said biasing means include spring means and damper means extending between said main frame and said swingarm, said spring means being adapted for deflection in two at least partially independent directions in a plane containing said main frame and said swingarm, wherein said spring means comprise a leaf spring located above said link means.

2. A rear suspension system as defined in claim 1, wherein said link means is substantially rigid.

3. A rear suspension system as defined in claim 1, wherein said biasing means have two degrees of freedom.

4. A rear suspension system as defined in claim 1, wherein said leaf spring includes an upwardly arcuate portion, said leaf spring being adapted to be rigidly attached at a first end portion thereof to an upwardly extending rear member of the main frame and at a second opposed end portion thereof to an upper member of the swingarm.

5. A rear suspension system as defined in claim 1, wherein said leaf spring has a substantially inverted U-shaped configuration, said leaf spring being adapted to be rigidly attached at a first end portion thereof to an upwardly extending member of the main frame and at a second opposed end portion thereof to an upwardly extending front member of the swingarm.

6. A rear suspension system as defined in claim 1, wherein said damper means are pivotally connected at opposed end portions thereof to the main frame and to the swingarm.

7. A rear suspension system as defined in claim 6, wherein said damper means extend through a longitudinal slot defined in said leaf spring.

8. A bicycle frame comprising a main frame, a swingarm supporting a rear wheel axle about which a rear wheel may be mounted, a rear suspension system comprising link means pivotally mounted at two spaced-apart locations to said main frame and to said swingarm, and biasing means for normally urging said swingarm and said main frame in a relative equilibrium position, said biasing means and said link means cooperating for constricting relative motions of said main frame and said swingarm to two degrees of freedom, a pedal crankset assembly being mounted to a lower portion of said swingarm, said link means being pivotally mounted at a first end portion thereof to a lower rear portion of said main frame for rotation about a first pivot axis said link means being pivotally mounted at a second end portion thereof to a lower front portion of said swingarm for rotation about a second pivot axis, said second pivot axis being located above or below a principal axis of the bicycle when said main frame and said swingarm are in said relative equilibrium position, said principal axis extending through said first pivot axis and parallelly to a bicycle axis extending through the front and rear wheel axles of the bicycle.

9. A bicycle frame as defined in claim 8, wherein said second pivot axis is located in front of the pedal crankset assembly.

10. A bicycle frame comprising a main frame, a swingarm supporting a rear wheel axle about which a rear wheel may be mounted, a rear suspension system comprising link means pivotally mounted at two spaced-apart locations to said main frame and to said swingarm, and biasing means for normally urging said swingarm and said main frame in a relative equilibrium position, said biasing means and said link means cooperating for constricting relative motions of said main frame and said swingarm to two degrees of freedom, a pedal crankset assembly being mounted to a lower portion of said main frame, said link means being pivotally mounted at a first end portion thereof to a lower rear portion of said main frame for rotation about a first pivot axis, said link means being pivotally mounted at a second end portion thereof to a lower front portion of said swingarm for rotation about a second pivot axis, said first pivot axis being located below the pedal crankset assembly.

11. A bicycle frame comprising a main frame, a swingarm supporting a rear wheel axle about which a rear wheel may be mounted, a rear suspension system comprising link means pivotally mounted at two spaced-apart locations to said main frame and to said swingarm, and biasing means for normally urging said swingarm and said main frame in a relative equilibrium position, said biasing means and said link means cooperating for constricting relative motions of said main frame and said swingarm to two degrees of freedom, wherein said biasing means include spring means and damper means extending between said main frame and said swingarm, said spring means being adapted for deflection in two at least partially independent directions in a plane containing said main frame and said swingarm, wherein said spring means comprise a leaf spring located above said link means.

12. A bicycle frame as defined in claim 11, wherein said biasing means have two degrees of freedom.

13. A bicycle frame as defined in claim 11, wherein said leaf spring includes an upwardly arcuate portion, said leaf spring being adapted to be rigidly attached at a first end portion thereof to an upwardly extending rear member of the main frame and at a second opposed end portion thereof to an upper member of the swingarm.

14. A bicycle frame as defined in claim 11, wherein said leaf spring has a substantially inverted U-shaped configuration, said leaf spring being adapted to be rigidly attached at a first end portion thereof to an upwardly extending member of the main frame and at a second opposed end portion thereof to an upwardly extending front member of the swingarm.

15. A bicycle frame as defined in claim 11, wherein said damper means are pivotally connected at opposed end portions thereof to the main frame and to the swingarm.

16. A bicycle frame as defined in claim 15, wherein said damper means extend through a longitudinal slot defined in said leaf spring.

* * * * *